(12) United States Patent
Chen et al.

(10) Patent No.: US 8,961,819 B2
(45) Date of Patent: Feb. 24, 2015

(54) HIGH-CAPACITY COMPLEX HYDROGEN STORAGE MATERIALS AND A PROCESS OF RELEASING HYDROGEN

(75) Inventors: Ping Chen, Dalian (CN); Xueli Zheng, Dalian (CN); Hailiang Chu, Dalian (CN); Zhitao Xiong, Dalian (CN); Guotao Wu, Dalian (CN)

(73) Assignee: Dalian Institute of Chemical Physics, Chinese Academy of Sciences, Dalian, Liaoning (CN)

( * ) Notice: Subject to any disclaimer, the term of this patent is extended or adjusted under 35 U.S.C. 154(b) by 1101 days.

(21) Appl. No.: 12/972,569

(22) Filed: Dec. 20, 2010

(65) Prior Publication Data

US 2012/0093714 A1    Apr. 19, 2012

(30) Foreign Application Priority Data

Oct. 13, 2010  (CN) .......................... 2010 1 0505247

(51) Int. Cl.
*C01B 3/04*  (2006.01)
(52) U.S. Cl.
CPC . *C01B 3/04* (2013.01); *Y02E 60/364* (2013.01)
USPC ............ 252/182.34; 252/188.25; 252/188.26; 423/648.1; 423/658.2; 502/200; 502/202; 502/400; 502/406; 564/9
(58) Field of Classification Search
CPC ......... Y02E 60/32; Y02E 60/364; C01B 3/00; C01B 3/04; C01B 3/065; C01B 3/12; C01B 3/323; C01B 6/00; C01B 6/04; C01B 6/21; C01B 6/24; B01J 23/40; B01J 23/70; B01J 23/74; B01J 23/745; B01J 23/75; B01J 23/755

USPC ............ 423/648.1, 658.2, 286, 284; 502/200, 502/202, 400, 406; 252/188.25, 182.34
See application file for complete search history.

(56) References Cited

U.S. PATENT DOCUMENTS 4,604,271 A    8/1986  Wagner

OTHER PUBLICATIONS

Soloveichik, (2008) Ammine Magnesium Borohydride Complex as a New Material for Hydrogen Storage: Structure and Properties of Mg(BH4)2.2NH3 Inorganic Chemistry 47, 4290-4298.*
Yu et al, "A Combined Hydrogen Storage System of Mg(BH4)2-LiNH2 with Favorable Dehydrogenation," J. Phys. Chem. C 2010, 114, 4733-4737.*
Sullivan, et al. "The Lithium Borohydride-Ammonia System: Pressure-Composition-Temperature Relationships and Densities", Phys. Chem. 1959, 63, 233-238.*

(Continued)

*Primary Examiner* — Stanley Silverman
*Assistant Examiner* — Kallambella Vijayakumar
(74) *Attorney, Agent, or Firm* — Novick, Kim & Lee, PLLC; Allen Xue

(57) ABSTRACT

Disclosed herein provide compositions and hydrogen release methods for a high-capacity complex hydrogen storage material. The hydrogen storage material is mainly composed of metal borohydride and $NH_3$. The invention advantageously adopt ammonia, one cheap and easily supplied material with high hydrogen content (17.6 wt %), as one of the hydrogen source, offering a safe and efficient way to store hydrogen and release hydrogen. Furthermore, the hydrogen storage material can be further catalyzed by a transition metal catalyst to improve the dehydrogenation kinetics. With the addition of catalyst, 0.2-10 equiv. $H_2$ could be evolved at −100~600° C., which might be applied on vehicles which are fueled by hybrid or fuel cell.

13 Claims, 5 Drawing Sheets

(56) References Cited

OTHER PUBLICATIONS

Johnson, et al. "The Monoammoniate of Lithium Borohydride, Li(NH3)BH4: An Effective Ammonia Storage Compound" Chemistry Asian J. 2009, 4, 849-854.*

Sullivan, et al. (1959) "The Lithium Borohydride-Ammonia System: Pressure-Composition-Temperature Relationships and Densities" Phys. Chem. 63, 233-238.

Johnson, et al. (2009) "The Monoammoniate of Lithium Borohydride, Li(NH3)BH4: An Effective Ammonia Storage Compound" Chemistry Asian J. 4, 849-854.

Guo, et al. (2010) "Hydrogen Release from Amminelithium Borohydride, LiBH4•NH3" Chemistry Communication. 46, 2599-2601.

Soloveichik, (2008) "Ammine Magnesium Borohydride Complex as a New Material for Hydrogen Storage: Structure and Properties of Mg(BH4)2•2NH3" Inorganic Chemistry 47, 4290-4298.

* cited by examiner

HIGH-CAPACITY COMPLEX HYDROGEN STORAGE MATERIALS AND A PROCESS OF RELEASING HYDROGEN

FIELD OF THE INVENTION

The present invention relates to a kind of hydrogen storage materials. In particular, this disclosure relates to compositions, methods and systems for the on-site hydrogen generation.

BACKGROUND OF THE INVENTION

Hydrogen is a promising clean energy fuel source. Hydrogen storage has been a challenging and critic technique for hydrogen fuel cell technology. Tremendous efforts have been devoted to the development of hydrogen storage materials including complex and chemical hydrides composed of light elements and with high hydrogen contents. Borohydrides, with high hydrogen contents have attracted considerable research attentions; however, they often encounter some critical problems for applications, for example, very slow reaction rates and unacceptably high reaction temperatures. More specifically, $LiBH_4$ (~18.4 wt %), its fully thermal decomposition is highly endothermic and requires high operation temperatures up to 320-900° C. A number of approaches have been adopted to improve the thermodynamic properties of hydrogen release from $LiBH_4$ which are by reacting $LiBH_4$ with chemicals such as $SiO_2$, $LiNH_2$, $MgH_2$ and $CaH_2$ etc. But the major hydrogen release needs relatively high temperatures (250-450° C.).

$NH_3$ is also regarded as a hydrogen carrier due to its high hydrogen content and low liquefaction pressure. Nevertheless, given the state of "cracking" ammonia to hydrogen and nitrogen is an endothermic process, there are many issues in the on-board use of ammonia. Specifically, high operating temperature (>500° C.), longevity and reliability of catalysts and other components (at high temperatures and in the presence of impurities), purification requirements (to prevent ammonia poisoning of fuel cells), and etc.

Interesting results shown in a few recent investigations demonstrate that upon forming ammoniates, hydrogen can be produced through the interaction of $NH_3$ with the host boron-containing hydrides. For instance, $Mg(NH_3)_2(BH_4)_2$ releases hydrogen in the temperature range of 150-400° C. with minor amount of $NH_3$ (5-7 wt %). Protic H(N) and hydridic H(B) co-exist in the complex, where the strong potential in the combination of the oppositely charged H atoms to produce $H_2$ and the establishment of strong B—N bond should be the driving forces for the dehydrogenation. It is, therefore, very interesting to investigate the dehydrogenation of a complex storage material comprises borohydride, ammonia and amide, since they are both high hydrogen content chemicals. Previous study reveals the thermal decomposition of lithium borohydride monoammoniate under a flow of inert gas can only give $NH_3$ rather than $H_2$. It is worthy of finding approaches to release hydrogen rather than $NH_3$ from the system comprising lithium borohydride and ammonia. In the present invention, high-capacity of hydrogen can be released under mild conditions, from the hydrogen storage material comprising borohydride, ammonia and amide.

SUMMARY OF THE INVENTION

It is meaningful to develop ammonia and borohydride based materials for hydrogen storage. The present invention provides methods, compositions and systems for high-capacity complex hydrogen storage materials. In order to improve the dehydrogenation kinetics, the dehydrogenation of borohydride and ammonia (or adding amide) is carried out in a closed system with the presence of metal catalysts. The borohydride have a formula of $M1(BH_x)_n$, wherein $0<x\leq 4$ and $0<n\leq 6$, M1 is one or more elements selected from Group IA, Group IIA, Group IIIA, Group IVA, Group IB, Group IIB, Group IVB, Group VB, Group VIB, Group VIIB and Group VIIIB of the standard period table, IUPAC system, respectively, more preferably M1 is selected from Li, Na, K, Mg, Ca, Al, Ti, Zr, V, Cr, Mn, Fe, Co, Ni, Cu, Zn and the mixtures thereof. The molar ratio of $NH_3$ to $M1(BH_x)_n$ is from 0.1/1 to 10/1, more preferably from 1/10~5/1.

In one preferred embodiment of the present invention, the hydrogen storage materials comprise amide, which interacted with borohydride through chemical bond.

The amide have a formula of $M2(NH_y)_m$ ($0<y\leq 2$, $0<m\leq 6$). Wherein M2 is one or more elements selected from Group IA, Group IIA, Group IIIA, Group IVA, Group IB, Group JIB, Group IVB, Group VB, Group VIB, Group VIIB and Group VIIIB of the standard period table, IUPAC system, respectively, more preferably at least one from Li, Na, K, Mg, Ca, Al, Ti, Zr, V, Cr, Mn, Fe, Co, Ni, Cu, Zn and the mixtures thereof. The molar ratio of $M2(NH_y)_m$ to $M1(BH_x)_n$ is from 0.01/1 to 100/1, more preferably from 1/50~10/1.

In another embodiment, transition metal catalyst could be introduced into the system to improve the kinetics, which is at least one or more elements from Group IB, Group IIB, Group IIIB, Group IVB, Group VB, Group VIB, Group VIIB and Group VIIIB of the standard period table, IUPAC system. The molar ratio of the catalyst to $M1(BH_x)_n$ is 0.02-20 mol %. The catalyst is selected at least one from the group consisting of Ti, V, Cr, Mn, Fe, Co, Ni, Cu, Zn, Rh, Pd, Ag, Ir, Pt, Au or the mixtures thereof or their alloys, or metal or alloy with B and/or N, more preferably, metal or alloy. The metal or alloy could produced by the interaction of the borohydride and metal salts during ball milling process, wherein the metal salts could be one or more selected from metal carbonate, acetate, nitrate, nitrite, phosphate, sulfide, sulfite, fluoride, chloride, bromide of metal Ti, V, Cr, Mn, Fe, Co, Ni, Cu, Zn, Rh, Pd, Ag, Ir, Pt or Au.

The storage material comprised of borohydride and ammonia could be prepared by exposing post-milled borohydride (with/without metal catalyst) to pre-weighted ammonia. As for storage material consist with borohydride, amide (with/without metal catalyst), it could be prepared by firstly ball milling the mixture of borohydride and amide (with/without metal catalyst), and subsequently exposing to pre-weighted ammonia. The ball milling treatment could reduce the particle size, and get well-dispersion and nano-sized metal catalyst.

The method to release hydrogen rather than ammonia is performing the volumetric release in a small closed vessel. $NH_3$ can easily adduct to $LiBH_4$ and form ammoniates with varied compositions, the retaining of $NH_3$ in the materials applied in this study is through equilibrium-vapor-pressure control. The confinement of $NH_3$ in the vicinity of $M1(BH_x)_n$ creates a reaction environment that allows the dissociation of both N—H$^{\delta+}$ and B—H$^{\delta-}$ bonds and the formation of $H_2$ in mild conditions (-100~600° C.).

The process of releasing hydrogen including the following steps:
1. Adding one or more transition metals salts of metal Ti, V, Cr, Mn, Fe, Co, Ni, Cu, Zn, Rh, Pd, Ag, Ir, Pt or Au into borohydride with or without amide under Argon atmosphere.

2. The ball milling of the mixture obtained by the above step 1 was conducted at 200 rpm for 8 hours on a planetary Retch PM 400 mill in order to reduce the transition metals or metal alloys to low valence.

3. Transferring the mixture obtained by the step 2 into a closed vessel, and then a given weighted of ammonia is introduced. Heating and monitoring the pressure inside the vessel with a pressure recorder.

The temperature of dissociating the hydrogen storage materials is in the range of −100 to 600° C., preferably from −50 to 400° C., obtaining 0.2~10 equivalent moles of $H_2$.

The invention advantageously adopt ammonia, one cheap and easily supplied material with high hydrogen content (17.6 wt %), as one of the hydrogen source, offering a safe and efficient way to store hydrogen and release hydrogen. Furthermore, the hydrogen storage material can be further catalyzed by a transition metal catalyst to improve the dehydrogenation kinetics. With the addition of catalyst, 0.2-10 equiv. of $H_2$ could be evolved at −100~600° C., which might be applied on vehicles which are fueled by hybrid or fuel cell.

BRIEF DESCRIPTION OF THE DRAWINGS

There is shown in the drawings embodiments, which are presently preferred, it being understood, however, that the invention can be embodied in other forms without departing from the spirit or essential attributes thereof.

FIG. 1 (B) is the calculated equivalent $NH_3$ remaining in the Li $(NH_3)_{4/3}BH_4$ sample as a function of temperature.

FIG. 3 (B) is the calculated equivalent $NH_3$ remaining in the $Li(NH_3)BH_4$ sample as a function of temperature.

FIG. 5 (B) is calculated equivalent $NH_3$ remaining in the $Li(NH_3)_2BH_4$ sample as a function of temperature.

DETAILED DESCRIPTIONS OF THE INVENTION

Figure 1:
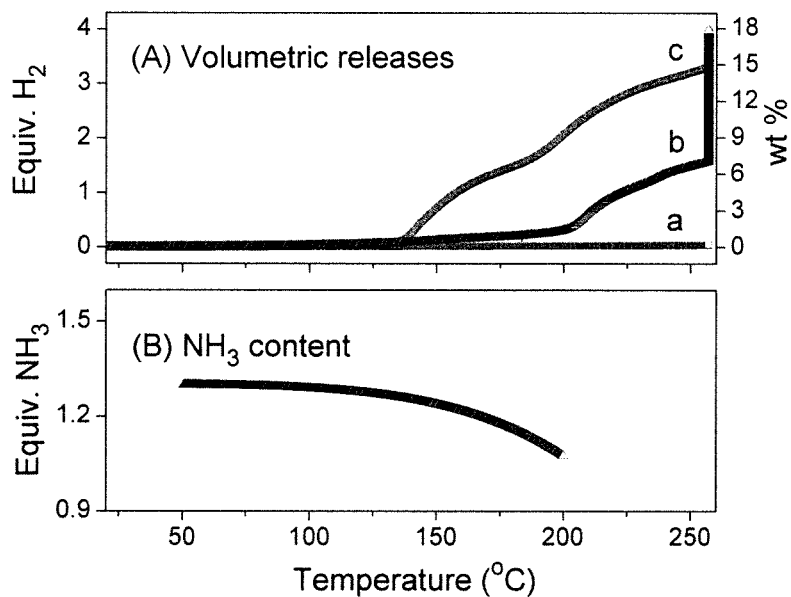
FIG. 1 (A) is volumetric release of a) Co-doped $LiBH_4$, b) neat $Li(NH_3)_{4/3}BH_4$ and c) Co-doped $Li(NH_3)_{4/3}BH_4$.

It must be noted that, as used in this specification and the appended claims, the forms "a" and "the" do not denote a limitation of quantity, but rather denote the presence of at least one of the referenced item unless the context clearly dictates otherwise. Thus, for example, reference to "the borohydride" includes one or more of such materials. The modifier "around", "about" used in connection with a quantity is to provide flexibility to the given value, that may be "a little above" or "a little below" the endpoint. It is to be noted that the degree of flexibility of this term can be dictated by the particular variable and would be within the knowledge of those skilled in the art to determine based on experience and the associated description.

The term "composition" and "composite" refer broadly to a substance containing at least the preferred chemical compound complex or phases, but which may also comprise additional substances or compounds. The term "material" also broadly refers to matter containing the preferred compound composition complex or phases.

As used herein, "hydrogen capacity" or "wt %" refers to the total weight percentage of hydrogen. This total weight includes hydrogen stored chemically as a hydrogen-containing compound and is not intended to include free hydrogen.

As used herein, "volumetric release" is a technique for thermal dehydrogenation measurement.

As used herein, "XRD" or "X-ray diffraction analysis" is a technique for revealing the crystallography in which the pattern of X-rays diffracted through the closely spaced lattice of atoms in a crystal.

As used herein, a numerical range of "−100~600" should be interpreted to include not only the explicitly recited values of −100 to 600, but also include individual values and sub-ranges within the indicated range. Thus, included in this numerical range are individual values as −90, −80 and 500 and sub-ranges such as from −90~500, and from −80~450 and from 100~550, etc.

Hydrogen generation disclosed herein offers high specific energy storage density by virtue of the mild reaction conditions available, safely and reliably in an integrated and self-sustaining device. In some embodiments, the borohydride can be $LiBH_4$, $NaBH_4$, $Ca(BH_4)_2$, $Mg(BH_4)_2$, $Zn(BH_4)_2$ or the mixtures thereof. The amide can be $LiNH_2$, $NaNH_2$, $Mg(NH_2)_2$, $Ca(NH_2)_2$ or the mixtures thereof. The molar ratio of $NH_3$ to the borohydride can be in-between 0.1-10. Regarding the thermal dehydrogenation of borohydride and ammonia, no detectable hydrogen gas is released under heating in a flow mode, however, ammonia released completely at 35-180° C. This invention thus overcomes the disadvantages of known techniques for dehydrogenation of borohydride ammoniate by retaining the majority of $NH_3$ in the vicinity of the borohydride through equilibrium pressure control, thus creates an environment favorable for the direct dehydrogenation rather than deammoniation.

EXAMPLES

It should be understood that the Examples described below are provided for illustrative purposes only and do not in any way define the scope of the invention. In all cases, $LiBH_4$ and anhydrous $CoCl_2$ with purities of 95% and 97% were purchased from Acros and Aldrich, respectively. Anhydrous $NH_3$ gas with a claimed purity of 99.999% was supplied by CREDIT. To prevent air contaminations, all the sample loadings and handlings were conducted in an MBRAUN glovebox filled with purified argon.

In this invention, the volumetric releases were performed on a closed system connected with a pressure recorder. The way to retain $NH_3$ in the vicinity of $LiBH_4$ is through equilibrium-vapor-pressure control via conducing in a closed vessel. The equivalent amount of $NH_3$ remaining in the sample at given temperatures can be calculated from the volume of empty space and $NH_3$ vapor pressure at equilibrium through ammonia gas equation. The low $NH_3$ equilibrium vapor pressure of the ammoniate in the vessel results in the retention of the majority of $NH_3$ in the vicinity of $LiBH_4$, and thus, creates an environment favorable for the direct dehydrogenation rather than deammoniation.

Example 1

Neat and Co-Doped $LiBH_4$-⁴⁄₃$NH_3$

Mixture of $CoCl_2$—$LiBH_4$ (molar ratio 0.026:1) was mechanical milled at 200 rpm for 8 hours on a planetary Retch PM 400 mill. The sample $LiBH_4$—$NH_3$ (molar ratio 3:4) was prepared by exposing $LiBH_4$ to anhydrous $NH_3$ atmosphere.

FIG. 1B reveals that 1.30, 1.26 and 1.07 equiv. $NH_3$ retained in the sample at 55° C. ($Li(NH_3)_{4/3}BH_4$ transfers to liquid state), 135° C. (onset temperature for Co-doped sample) and 200° C. (onset temperature for neat sample), respectively. In other words, the majority of $NH_3$ stays in the condensed phase and in the vicinity of $LiBH_4$. FIG. 1A shown the thermal decomposition feature of $Li(NH_3)_{4/3}BH_4$ in the closed vessel. Slight pressure increase (which is mainly due to $NH_3$ release) was detected at temperatures below 200° C. However, a remarkable pressure jump due to $H_2$ release was observed when the temperature surpassed 200° C.; finally 17.9 wt % or about 4.0 equivalent moles of $H_2$ can be detached after heating the sample at 250° C. for about 20 hours. $NH_3$ concentration in the gaseous phase is below 320 ppm evidencing the stoichiometric conversion of $NH_3$ to $H_2$. $LiBH_4$ alone doped with 2.6 mol % $CoCl_2$ librates little $H_2$ at 250° C. due to thermodynamic reason.

With the presence of Co catalyst, hydrogen evolution took place at about 135° C., which is 65° C. lower than that for the undoped sample. ca. 4.0 equiv. of $H_2$ can be detached in the temperature range of 135-250° C., which is among the highest amount of hydrogen desorption in this temperature range ever reported.

Figure 2:
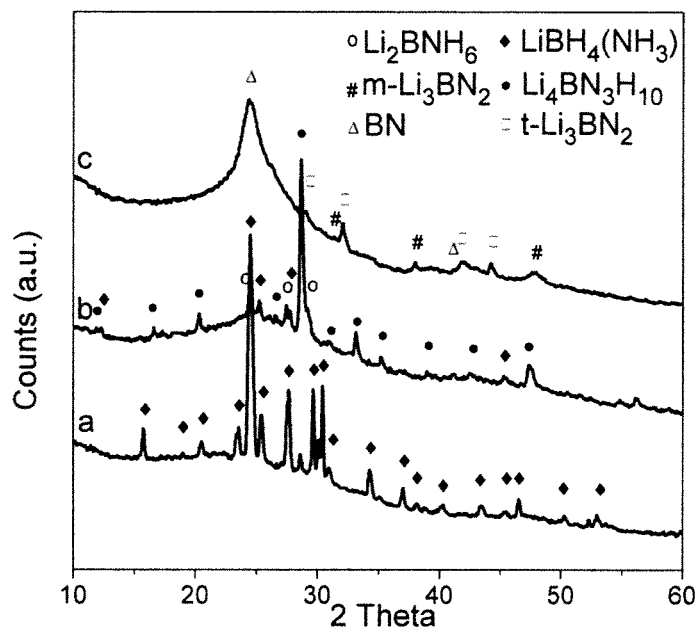
FIG. 2 illustrates XRD patterns of a) the fresh-made Co-doped $Li(NH_3)_{4/3}BH_4$ sample, and the samples after dehydrogenation at b) 180° C., and c) 250° C., respectively. m-$Li_3BN_2$ and t-$Li_3BN_2$ represent the monoclinic and tetragonal $Li_3BN_2$ phase, respectively.

In order to understand the dehydrogenation reaction, X-ray diffraction analysis was carried out on the sample before and after dehydrogenation. In FIG. 2a, which shows the XRD pattern of $Li(NH_3)_{4/3}BH_4$ before dehydrogenation, the peaks are attributed to $Li(NH_3)BH_4$. FIG. 2b shows the presence of $Li_4BN_3H_{10}$ and $Li_2BNH_6$ after releasing at 180° C. FIG. 2c indicates the formation of $Li_3BN_2$ (monoclinic and tetragonal phases) and BN upon full dehydrogenation. Thus, the dehydrogenation process of the sample in the closed vessel can be described by the reaction 1:

$$Li(NH_3)_{4/3}BH_4 \rightarrow \tfrac{1}{3}Li_3BN_2 + \tfrac{2}{3}BN + 4H_2 \quad (1)$$

Example 2

Co-Doped $Li(NH_3)BH_4$

Co-doped $Li(NH_3)BH_4$ sample was prepared in the $LiBH_4$/$NH_3$ molar ratio of 1/1, following the same procedures given in Example 1.

Figure 3:
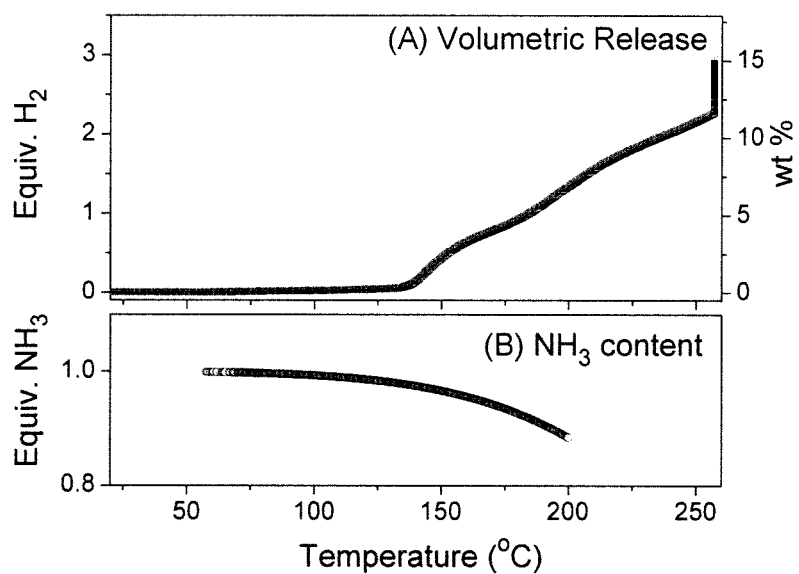
FIG. 3 (A) is volumetric release curve of Co-doped $Li(NH_3)BH_4$ sample.
Figure 4:
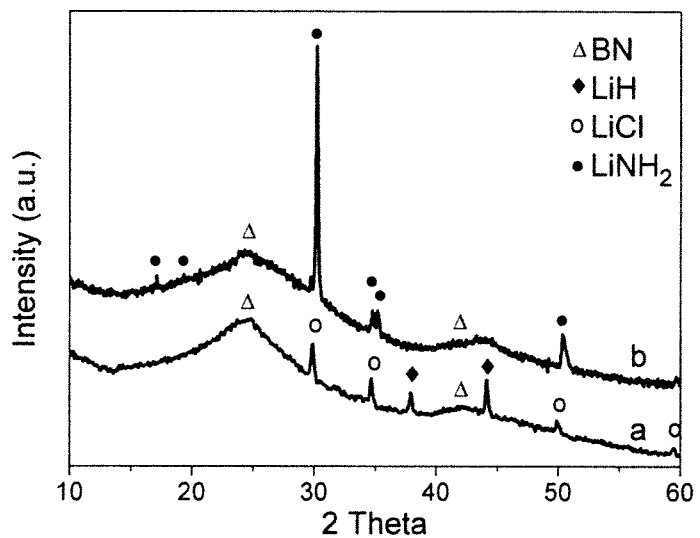
FIG. 4 illustrates XRD patterns of a) the Co-doped $Li(NH_3)BH_4$ and b) $Li(NH_3)_2BH_4$ samples after dehydrogenation at 250° C.

FIG. 3 shows the volumetric hydrogen release and calculated equivalent $NH_3$ remaining in the Co-doped $Li(NH_3)BH_4$ sample. Hydrogen evolution took place at 140° C., with 0.97 equiv. $NH_3$ retained in the vicinity of the sample. 15.3 wt % or about 3.0 equivalents $H_2$ can be detached after heating the sample at 250° C. for about 11 hours. High purity of hydrogen was evolved with the $NH_3$ concentration in the gaseous phase of below 106 ppm. FIG. 4a shows the final products are LiCl (from the interaction of $LiBH_4$ and $CoCl_2$). LiH and BN, thus, the dehydrogenation can be written as reaction 2:

$$Li(NH_3)BH_4 \rightarrow LiH + BN + 3H_2 \quad (2)$$

Example 3

Co-Doped $Li(NH_3)_2BH_4$

Sample was prepared in the $LiBH_4$/$NH_3$ molar ratio of 1/2, following the same procedures given in Example 1.

Figure 5:
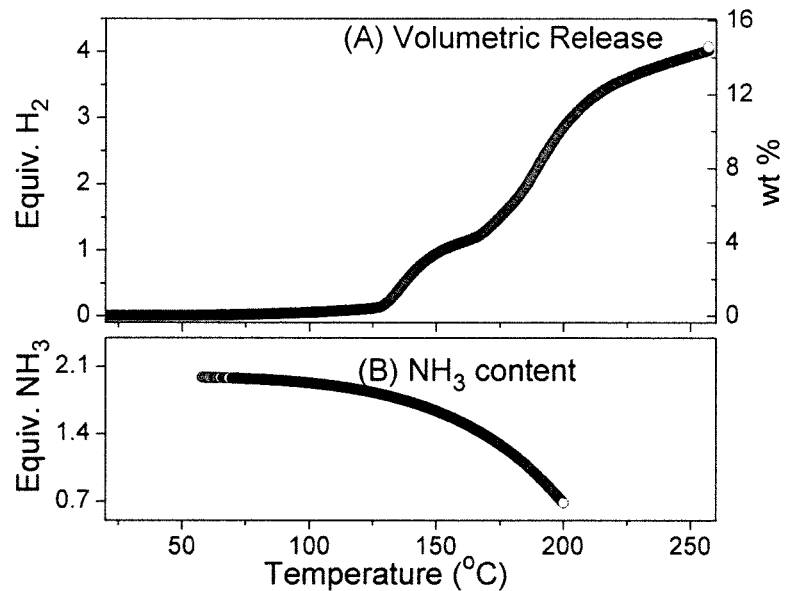
FIG. 5 (A) is volumetric release curve of Co-doped $Li(NH_3)_2BH_4$ sample.

FIG. 5 shows the volumetric hydrogen release and calculated equivalent $NH_3$ remaining in the Co-doped $Li(NH_3)_2BH_4$ sample. Hydrogen evolution took place at about 125° C., with 1.83 equiv. $NH_3$ retained in the vicinity of the sample. 14.3 wt % or about 4.0 equivalents $H_2$ can be detached upon heating the sample to 250° C. FIG. 4b shows the final products are $LiNH_2$ and BN, thus, the dehydrogenation can be written as reaction 3:

$$Li(NH_3)_2BH_4 \rightarrow LiNH_2 + BN + 4H_2 \quad (3)$$

Figure 6:
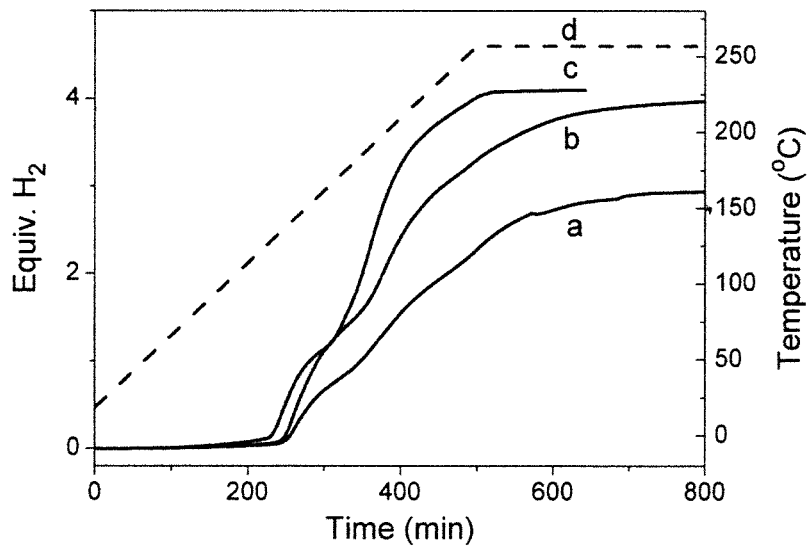
FIG. 6 illustrates volumetric releases of Co-doped a) $Li(NH_3)_2BH_4$, b) $Li(NH_3)_{4/3}BH_4$. c) $Li(NH_3)_2BH_4$ samples, d) Profile of the temperature.

FIG. 6 shows the hydrogen release results of the Co-doped $Li(NH_3)BH_4$, $Li(NH_3)_{4/3}BH_4$ and $Li(NH_3)_2BH_4$ samples. It can be seen that the hydrogen desorption kinetics (i.e., onset temperatures and desorption rates) could be better improved by presenting more $NH_3$, but the maximum desorption amount is 4 equivalent moles of $H_2$. Compare to the $Li(NH_3)BH_4$ and $Li(NH_3)_2BH_4$ samples, the $Li(NH_3)_{4/3}BH_4$ sample shows the highest hydrogen capacity of 17.9 wt % with a modest reaction rate.

Example 4

Co-Doped $Li(NH_3)_{4/3}BH_4$-½ (or 1) $LiNH_2$

Co-doped $Li(NH_3)_{4/3}BH_4$-½$LiNH_2$ sample was prepared by ball milling the mixture of $LiNH_2$, $LiBH_4$ and $CoCl_2$ in the molar ratio of 0.5/1/0.026 for 8 hours, and then pre-weighted ammonia ($LiBH_4$/$NH_3$ molar ratio of 3/4) was introduced to a vessel containing the post-ball milled $LiBH_4$-½$LiNH_2$-2.6 mol % $CoCl_2$ powder. Co-doped $Li(NH_3)_{4/3}BH_4$—$LiNH_2$ sample was prepared, following the same procedures.

Figure 7:
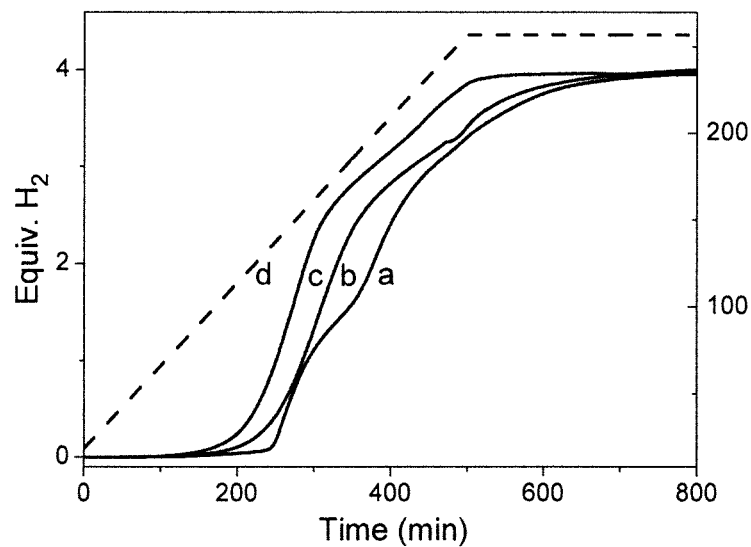
FIG. 7 illustrates volumetric releases of Co-doped a) $Li(NH_3)_{4/3}BH_4$, b) $Li(NH_3)_{4/3}BH_4$-0.5$LiNH_2$ and c) $Li(NH_3)_{4/3}BH_4$—$LiNH_2$, d) Profile of the temperature.

FIG. 7 reveals the corresponding volumetric release results. Compare with Co-doped $Li(NH_3)_{4/3}BH_4$ sample, the presence of $LiNH_2$ would low down the onset desorption temperatures and promote the reaction rate.

Example 5

Co-Doped $LiBH_4$-½$Ca(NH_2)_2$, $LiNH_2$-½$Ca(BH_4)_2$ with ⁴⁄₃$NH_3$ Samples Co-doped $LiBH_4$-½$Ca(NH_2)_2$-⁴⁄₃$NH_3$ sample was prepared by ball milling $Ca(NH_2)_2$$LiBH_4$ and $CoCl_2$ in the molar ratio of 0.5/1/0.026 for 8 hours, and then pre-weighted ammonia ($LiBH_4$/$NH_3$ molar ratio %) was introduced to a vessel containing the post-ball milled $LiBH_4$-½$Ca(NH_2)_2$-2.6 mol % $CoCl_2$ powder. Co-doped $LiNH_2$-½$Ca(BH_4)_2$-⁴⁄₃$NH_3$ samples were prepared, following the same procedures.

Figure 8:
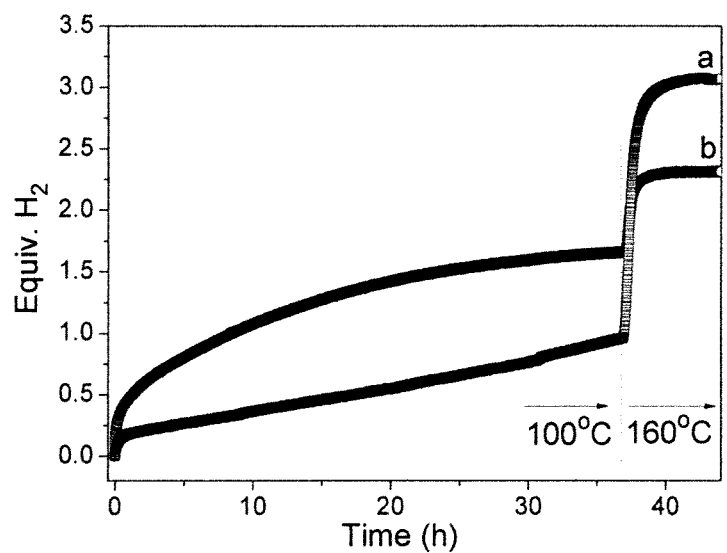
FIG. 8 illustrates volumetric releases of Co-doped a) $LiBH_4$-½$Ca(NH_2)_2$, b) $LiNH_2$-½$Ca(BH_4)_2$ samples with ⁴⁄₃$NH_3$ at 100 and 160° C.

FIG. 8 shows hydrogen desorption on 100 and 160° C. Hydrogen evolution can be occurred at temperature as low as 100° C. and around 2.0 equiv. $H_2$ would be evolved. More hydrogen would be evolved on heating to 160° C.

Figure 9:
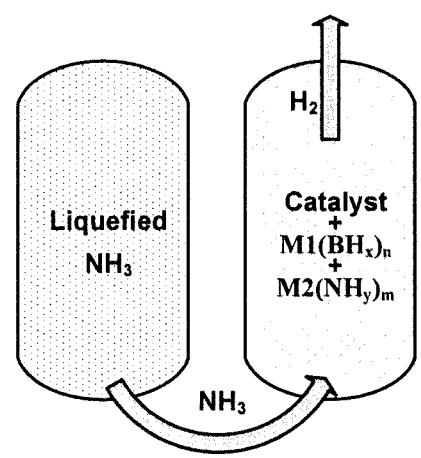
FIG. 9 illustrates conceptual hydrogen release from this complex storage system.

The complex hydrogen storage system, offers a safe way to store and control hydrogen release. The system design for the on-board $H_2$ generation is shown in FIG. 9. The borohydride-amide (with or without catalyst) and liquefied $NH_3$ are stored separately. The amount of $H_2$ can be controlled by regulating the amount of $NH_3$ to be entered in the borohydride-amide bottle. If $NH_3$ is introduced to the borohydride-amide bottle from the bottom, $NH_3$ concentration in the gaseous phase in the outlet can be further reduced through the subsequent absorption by the borohydride in the upper layer.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiments of the invention.

What is claimed is:

1. A hydrogen storage material, comprising:
$LiBH_4$, $NH_3$, and an amide of formula $M2(NH_y)_m$, wherein M2 is Na, K, Ca, Al, Ti, V, Cr, Mn, Fe, Co, Ni, Cu, or Zn, wherein $0<y\leq2$ and $0<m\leq6$.

2. The hydrogen storage material according to claim 1, a molar ratio of $NH_3$ to $LiBH_4$ is from 0.1/1 to 10/1.

3. The hydrogen storage material according to claim 2, the molar ratio of $NH_3$ to $LiBH_4$ is from 1/10 to 5/1.

4. The hydrogen storage material according to claim 1, a molar ratio of $M2(NH_y)_m$ to $LiBH_4$ is from 0.01/1 to 100/1.

5. The hydrogen storage material according to claim 4, wherein the molar ratio of $M2(NH_y)_m$ to $LiBH_4$ is from 1/50 to 10/1.

6. The hydrogen storage material according to claim 1, further comprising a catalyst chosen from
a metal catalyst selected from a group consisting of metallic Fe, Co, Ni, and mixtures thereof,
a metal alloy selected from the group consisting of Fe—Ni, Fe—Co, Fe—Ni, Co—Ni, and Fe—Co—Ni,
a metal nitride compound of said metal catalyst or said metal alloy catalyst,
a metal-boron compound of said metallic catalyst or said metal alloy catalyst, or
a mixture thereof.

7. The hydrogen storage material according to claim 6, wherein the catalyst is produced by reacting a metal borohydride and a metal salt, wherein the metal salt is chosen from carbonate, acetate, nitrate, nitrite, phosphate, sulfide, sulfite, fluoride, chloride, or bromide of Fe, Co, or Ni.

8. The hydrogen storage material according to the claim 6, wherein a molar ratio of the catalyst to $LiBH_4$ is 0.02-20 mol %.

9. A process of releasing hydrogen, comprising the step of:
providing a first vessel containing a hydrogen storage material of claim 1;
providing a second vessel containing liquid $NH_3$;
introducing a $NH_3$ flow into the first vessel;
bringing a temperature of the hydrogen storage material in the first vessel to $-50°$ C. to $400°$ C.; and
obtaining a hydrogen flow from the first vessel.

10. The process of claim 9, wherein the temperature of the hydrogen storage material is in the range of $135°$ C. to $250°$ C.

11. The process of claim 9, wherein the hydrogen flow contains less than about 300 ppm $NH_3$.

12. The process of claim 9, wherein the hydrogen flow contains less than about 100 ppm $NH_3$.

13. The process of claim 9, further comprising:
feeding the hydrogen flow from the first vessel to a fuel cell.

* * * * *